US008468326B1

(12) United States Patent
Kang et al.

(10) Patent No.: US 8,468,326 B1
(45) Date of Patent: Jun. 18, 2013

(54) METHOD AND APPARATUS FOR ACCELERATING EXECUTION OF LOGICAL "AND" INSTRUCTIONS IN DATA PROCESSING APPLICATIONS

(75) Inventors: Jack Kang, Sunnyvale, CA (US); Jianwei Bei, Rockville, MD (US); Shanker Rao Donthineni, Germantown, MD (US); Manish Kumar, Clarksburg, MD (US); Victor Lin, Fremont, CA (US); Justin Lau, Daly City, CA (US)

(73) Assignee: Marvell International Ltd., Hamilton (BM)

( * ) Notice: Subject to any disclaimer, the term of this patent is extended or adjusted under 35 U.S.C. 154(b) by 953 days.

(21) Appl. No.: 12/534,633

(22) Filed: Aug. 3, 2009

Related U.S. Application Data

(60) Provisional application No. 61/085,751, filed on Aug. 1, 2008.

(51) Int. Cl.
*G06F 9/30* (2006.01)

(52) U.S. Cl.
USPC .......................................... 712/221

(58) Field of Classification Search
None
See application file for complete search history.

(56) References Cited

U.S. PATENT DOCUMENTS

| | | | | |
|---|---|---|---|---|
| 5,426,743 A * | 6/1995 | Phillips et al. | ................. | 712/221 |
| 5,796,864 A * | 8/1998 | Callahan | ......................... | 382/166 |
| 6,658,578 B1 * | 12/2003 | Laurenti et al. | ............... | 713/324 |
| 6,675,376 B2 * | 1/2004 | Ronen et al. | ................... | 717/151 |

OTHER PUBLICATIONS

Brent M. Ledvina, Mark L. Psiaki, Steven P. Powell, and Paul M. Kinter, Bit-Wise Parallel Algorithms for Efficient Software Correlation Applied to a GPS Software Receiver, IEEE Transactions on Wireless Communications, vol. 3, No. 5, Sep. 2004, pp. 1469-1473.

\* cited by examiner

*Primary Examiner* — Jacob A Petranek

(57) ABSTRACT

A hardware module configured to perform single instructions faster than is possible in software running on the microprocessor. In one implementation, the hardware module is configured to perform a single count instruction, including - counting a number of "ones" contained in a first register; and storing, in a second register, the count of the number of "ones" contained in the first register.

7 Claims, 3 Drawing Sheets

METHOD AND APPARATUS FOR ACCELERATING EXECUTION OF LOGICAL "AND" INSTRUCTIONS IN DATA PROCESSING APPLICATIONS

CROSS-REFERENCE TO RELATED APPLICATIONS

This disclosure claims the benefit of U.S. Provisional Application No. 61/085,751, filed Aug. 1, 2008, which is incorporated herein by reference.

FIELD

The present disclosure generally relates to data processing.

BACKGROUND

A microprocessor (or CPU) typically executes instructions sequentially one by one. Hardware acceleration is one technique that can be used to improve the performance of a microprocessor. Hardware acceleration is the use of hardware to perform some function faster than is possible in software running on the microprocessor.

SUMMARY

In general, in one aspect, this specification describes a hardware module operable to perform a single count instruction, including—counting a number of "ones" contained in a first register; and storing, in a second register, the count of the number of "ones" contained in the first register. In one implementation, the hardware module is further configured to count a number of "ones" contained in a third register, and store, in the second register, the count of the number of "ones" contained in the third register.

In general, in another aspect, this specification describes a hardware module operable to perform a single AND instruction, including—performing a bit-wise AND of a first register, a second register, and a third register; and storing, in a fourth register, a result of the bit-wise AND of the first register, the second register, and the third register. In one implementation, the hardware module is further configured to count a number of "ones" contained in the result of the bit-wise AND of the first register, the second register, and the third register.

In general, in another aspect, this specification describes a hardware module operable to perform a single saturated addition/saturated subtraction instruction, including—performing a saturated add operation between a first register and a second register; performing, in parallel to the saturated add operation, a saturated subtraction operation between the first register and the second register; and storing, in a third register, a result of the saturated add operation and the saturated subtraction operation.

Implementations can include one or more of the following advantages. The instructions described herein reduce memory usage by combining instructions that are conventionally performed using two or more instructions into a single instruction. The instructions reduce memory usage within a microprocessor architecture (e.g., an ARM processor architecture), and permits code size to be reduced. In addition, during code execution, less temporary buffers are utilized to store intermediate (non-final) results.

BRIEF DESCRIPTION OF THE DRAWINGS

Like reference symbols in the various drawings indicate like elements.

DETAILED DESCRIPTION

Table 1 below describes 6 instructions—CNT32, BITCNT2, AND3, AND3ONE, QADDSUB, and QDADDSUB—that can be used to accelerate a function in hardware. In one implementation, each instruction is used to accelerate a global positioning system (GPS) function in hardware. For example, each instruction can be used for efficiently processing bit-wise parallel algorithms to correlate code-division multiple-access (CDMA) spread spectrum signals as described in—"Bit-Wise Parallel Algorithms for Efficient Software Correlation Applied to a GPS Software Receiver," IEEE Transactions on Wireless Communications, 3(5), September 2004, by B.M. Ledvina, M.L. Psiaki, S.P. Powell, and P.M. Kintne—which is incorporated herein by reference.

TABLE 1

| INSTRUCTION | FUNCTION |
| --- | --- |
| CNT32 | Counts the number of "ones" in a single (32-bit) register. |
| BITCNT2 | Counts number of "ones" in two (32-bit) registers. |
| AND3 | Performs a bit-wise AND of three (32-bit) registers. |
| AND3ONE | Performs a bit-wise AND of three (32-bit) registers, followed by a bit count operation. |
| QADDSUB | Performs saturated arithmetic - a QADD instructions and a QSUB instruction are performed in parallel. |
| QDADDSUB | Performs saturated arithmetic - a QDADD instructions and a QDSUB instruction are performed in parallel. |

Each of the instructions listed in Table 1 are described in turn below. In one implementation, each instruction is executable within a single instruction cycle. Alternatively, in other implementations, one or more of the instructions are executable over two or more instruction cycles.

CNT32 Instruction

Figure 1:
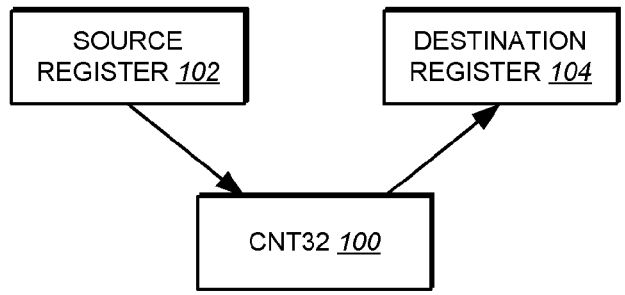
FIG. 1 illustrates an example hardware module to perform a CNT32 instruction.

FIG. 1 illustrates an example hardware module to perform a CNT32 (Count 32) instruction 100. The CNT32 instruction 100 counts the number of "ones" that are contained within a source register 102, and places the count (a result of the count) within a destination register 104. In one implementation, each of the source register 102 and the destination register 104 is a 32-bit register. For example, if the source register 102 contains the value 0x0000F0F1, then the value 0x9 will be stored within the destination register 104 after execution of the CNT32 instruction 100. The source register 102 and/or the destination register 104 can have a size other than 32 bits— e.g., the source register 102 and/or the destination register 104 can be an 8-bit register, a 64-bit register, a 128-bit register, and so on.

BITCNT2 Instruction

Figure 2:
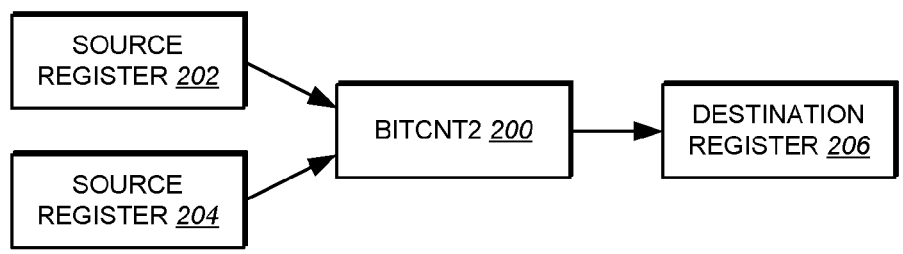
FIG. 2 illustrates an example hardware module to perform a BITCNT2 instruction.

FIG. 2 illustrates an example hardware module to perform a BITCNT32 (Bit Count 32) instruction 200. The BITCNT2 instruction 200 counts the number of "ones" that are contained within two source registers 202, 204, and places a result of the count within a destination register 206. In one implementation, the lower bits within the destination register 206 store a value of the number of "ones" contained within the source register 202, and the upper bits store a value of the number of "ones" contained within the source register 204.

In one implementation, each of the source registers 202, 204 and the destination register 206 is a 32-bit register. For example, if the source register 202 contains the value 0x0000_FFF0 and the source register 204 contains the value 0x8000_FFFF, then the destination register 206 will store a value 0x0011_000C after execution of the BITCNT2 instruction 200. The BITCNT2 instruction 200 is suitable for ARMv6 SIMD (Single Instruction, Multiple Data) instructions. Each of the source registers 202, 204 and/or the destination register 206 can have a size other than 32 bits—e.g., the source registers 202, 204 and/or the destination register 206 can be an 8-bit register, a 64-bit register, a 128-bit register, and so on.

AND3 Instruction

Figure 3:
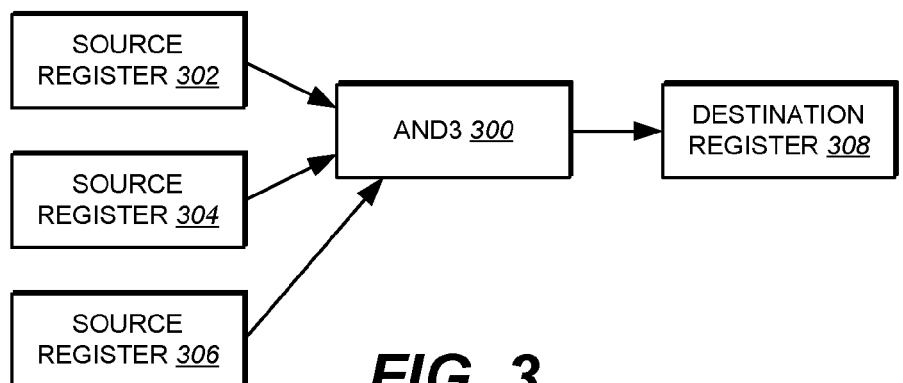
FIG. 3 illustrates an example hardware module to perform an AND3 instruction.

FIG. 3 illustrates an example hardware module to perform an AND3 (AND 3) instruction 300. The AND3 instruction 300 performs a bit-wise AND of three source registers 302, 304, 306, and places a result of the operation in a destination register 308. In one implementation, the AND3 instruction 300 also permits any of the source registers 302, 304, 306 to be bit-wise inverted prior to being AND'ed. In one implementation, 3opcode bits are used to respectively indicate whether source registers 302, 304, 306 are to be bit-wise inverted prior to being AND'ed.

In one implementation, each of the source registers 302, 304, 306 and the destination register 308 is a 32-bit register. Each of the source registers 302, 304, 306 and/or the destination register 308 can have a size other than 32 bits—e.g., the source registers 302, 304, 306 and/or the destination register 308 can be an 8-bit register, a 64-bit register, a 128-bit register, and so on.

AND3ONE Instruction

Figure 4:
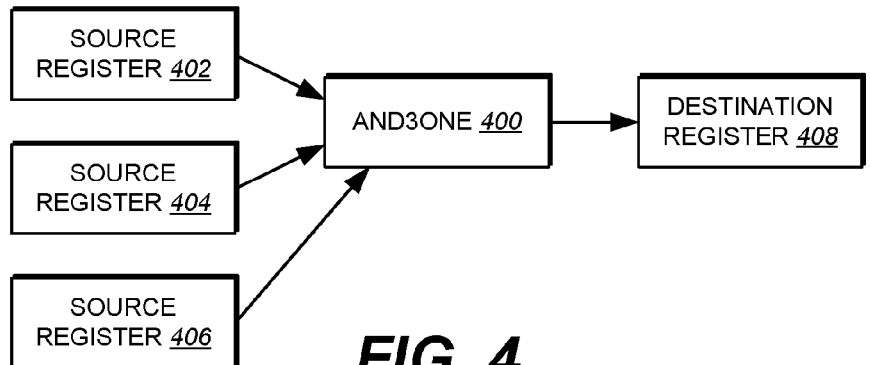
FIG. 4 illustrates an example hardware module to perform an AND3ONE instruction.

FIG. 4 illustrates an example hardware module to perform an AND3ONE (AND 3, ONE) instruction 400. The AND3ONE instruction 400 performs a bit-wise AND of three source registers 402, 404, 406, followed by a bit count operation. A result of the bit count operation is placed in a destination register 408. The bit count operation counts the number of "ones" contained in a result of the bit-wise AND of the three source registers 402, 404, 406. In one implementation, the AND3ONE instruction 400 also permits any of the source registers 402, 404, 406 to be bit-wise inverted prior to being AND'ed. In one implementation, 3 opcode bits are used to respectively indicate whether source registers 402, 404, 406 are to be bit-wise inverted prior to being AND'ed.

In one implementation, each of the source registers 402, 404, 406 and the destination register 408 is a 32-bit register. Each of the source registers 402, 404, 406 and/or the destination register 408 can have a size other than 32 bits—e.g., the source registers 402, 404, 406 and/or the destination register 408 can be an 8-bit register, a 64-bit register, a 128-bit register, and so on.

QADDSUB Instruction

Figure 5:
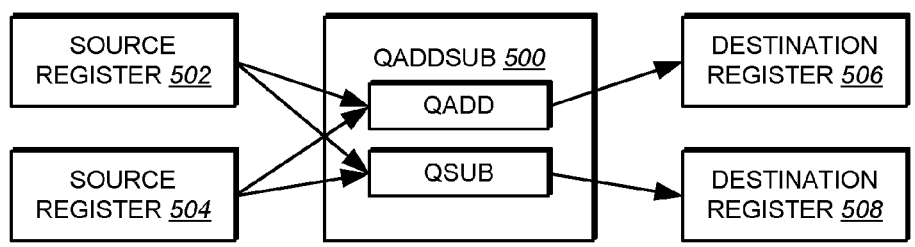
FIG. 5 illustrates an example hardware module to perform a QADDSUB instruction.

FIG. 5 illustrates an example hardware module to perform a QADDSUB (saturated addition/subtraction) instruction 500. The QADDSUB instruction 500 performs, in parallel, a QADD (saturated add) operation and a QSUB (saturated subtraction) operation based on values in source registers 502, 504. The QADD operation adds the values in source registers 502, 504, and the QSUB operation subtracts the value in source register 502 from the value in source register 504. A result of the QADDSUB instruction 500 is placed in one or more destination registers—e.g., destination registers 506, 508. Saturation arithmetic is a version of arithmetic in which all operations such as addition and subtraction are limited to a fixed range between a minimum value and maximum value. If the result of an operation is greater than the maximum value the result is set (or "clamped") to the maximum value, while if the result is below the minimum value the result is clamped to the minimum value.

In one implementation, each of the source registers 502, 504 and the destination registers 506, 508 is a 32-bit register. Each of the source registers 502, 504 and/or the destination registers 506, 508 can have a size other than 32 bits—e.g., the source registers 502, 504 and/or the destination registers 506, 508 can be an 8-bit register, a 64-bit register, a 128-bit register, and so on.

QDADDSUB Instruction

Figure 6:
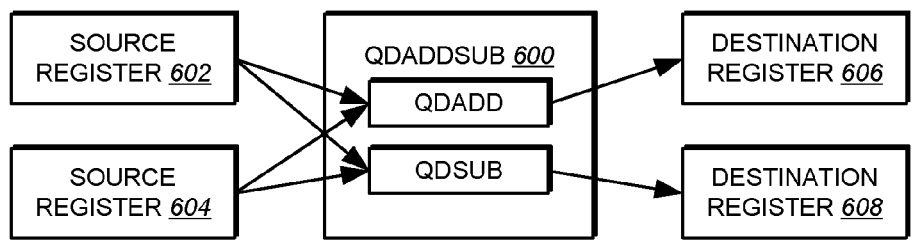
FIG. 6 illustrates an example hardware module to perform a QDADDSUB instruction.

FIG. 6 illustrates an example hardware module to perform a QDADDSUB (QD-saturated addition/subtraction) instruction 600. The QDADDSUB instruction 600 performs, in parallel, a QDADD operation and a QDSUB operation based on values in source registers 602, 604. The QDADD operation and the QDSUB operation double and saturate the source register 602 before respectively performing an addition and subtraction with the source register 604. In particular, the QDADD operation calculates the following:

$$SAT(Rm+SAT(Rn*2)) \qquad (eq. 1),$$

where Rn is the value in source register 602 and Rm is the value in source register 604. The QDSUB operation calculates the following:

$$SAT(Rm-SAT(Rn*2)) \qquad (eq. 2),$$

where Rn is the value in source register 602 and Rm is the value in source register 604. A result of the QDADDSUB instruction 600 is placed in one or more destination registers—e.g., destination registers 606, 608.

In one implementation, each of the source registers 602, 604 and the destination registers 606, 608 is a 32-bit register. Each of the source registers 602, 604 and/or the destination registers 606, 608 can have a size other than 32 bits—e.g., the source registers 602, 604 and/or the destination registers 606, 608 can be an 8-bit register, a 64-bit register, a 128-bit register, and so on.

Generally, the invention can take the form of an entirely hardware embodiment, or an embodiment containing both hardware and software elements. As used herein, the term "module" or "device" refers to an Application Specific Integrated Circuit (ASIC), an electronic circuit, a processor (shared, dedicated, or group) and memory that execute one or more software or firmware programs, a combinational logic circuit, and/or other suitable components to provide the described functionality.

Figure 7:
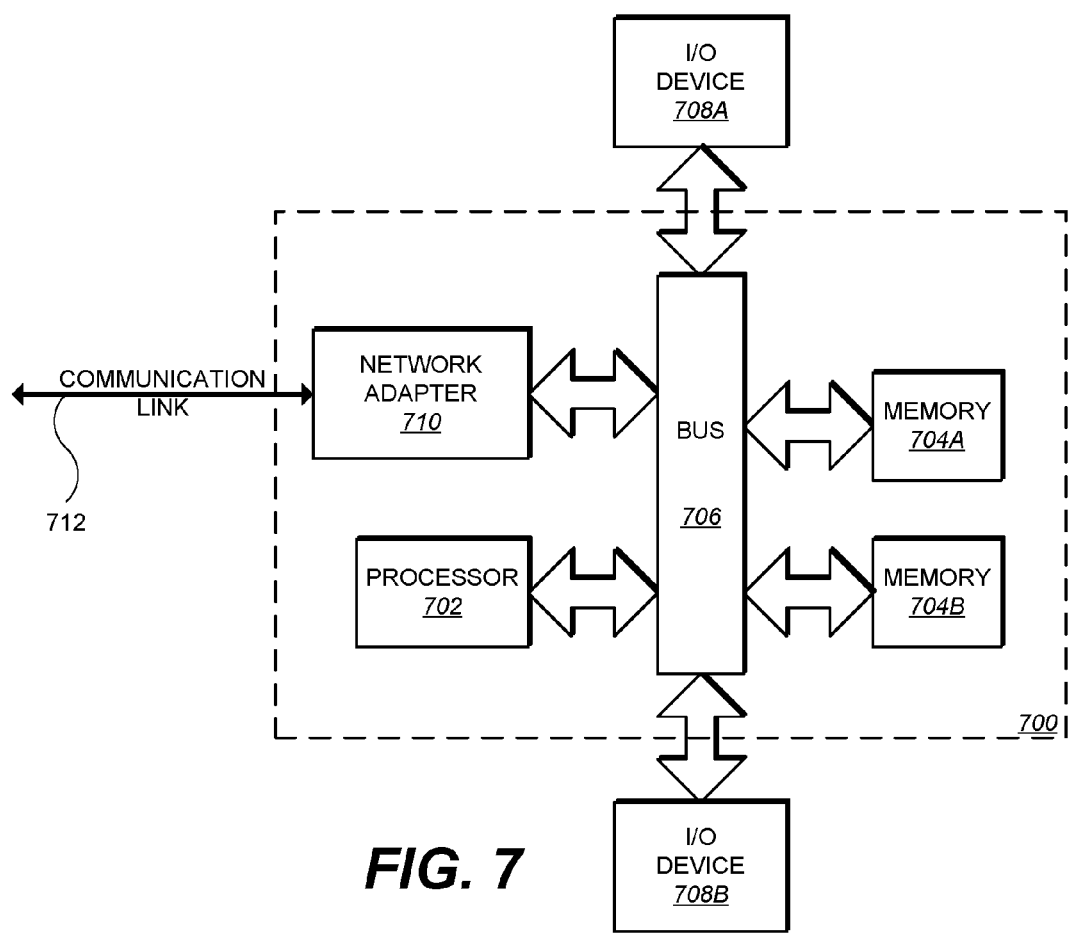
FIG. 7 is a block diagram of a data processing system suitable for storing and/or executing program code in accordance with one implementation of the invention.

FIG. 7 illustrates a data processing system 700 suitable for storing and/or executing program code. In one implementation, data processing system 700 is a software radio GPS receiver that processes bit-wise parallel algorithms to correlate code-division multiple-access (CDMA) spread spectrum signals as discussed above. In other implementations, data processing system 700 can be a computer system, a cell phone, a data storage system, or other device that processes data.

Data processing system 700 includes a processor 702 coupled to memory elements 704A-B through a system bus 706. In other implementations, data processing system 700 includes more than one processor and each processor may be coupled directly or indirectly to one or more memory elements through a system bus. Memory elements 704A-B can include local memory employed during actual execution of the program code, bulk storage, and cache memories that provide temporary storage of at least some program code in order to reduce the number of times the code must be retrieved from bulk storage during execution. As shown, input/output or I/O devices 708A-B (including, but not limited to, keyboards, displays, pointing devices, etc.) are coupled to data processing system 700. I/O devices 708A-B may be coupled to data processing system 700 directly or indirectly through intervening I/O controllers (not shown).

In one implementation, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

Although the subject matter has been described in language specific to structural features and/or methodological operations, the subject matter defined in the appended claims is not necessarily limited to the specific features or acts described above, including orders in which the acts are performed. For example, in the example hardware modules described above, although two (or more) different values are shown as being respectively received from two (or more) different registers, the different values can be received from a single register.

What is claimed is:

1. A hardware module operable to perform a single AND instruction, wherein the hardware module is configured to:
    perform a bit wise AND of a first register, a second register, and a third register;
    count a number of "ones" contained in a result of the bit wise AND of (i) the first register, (ii) the second register, and (iii) the third register; and
    store, in a fourth register,
        (i) the result of the bit wise AND of the first register, the second register, and the third register, and
        (ii) a result of the count of the number of "ones" contained in the result of the bit wise AND of the first register, the second register, and the third register.

2. The hardware module of claim 1, wherein the hardware module is further configured to bit wise invert any of the first register, the second register, and the third register prior to the bit wise AND being performed.

3. The hardware module of claim 2, wherein the hardware module is configured to perform the single AND instruction in a single instruction cycle.

4. The hardware module of claim 2, wherein the hardware module is configured to perform the single AND instruction in two or more instruction cycles.

5. The hardware module of claim 1, wherein the hardware module is configured to perform the single AND instruction in a single instruction cycle.

6. The hardware module of claim 1, wherein the hardware module is configured to perform the single AND instruction in two or more instruction cycles.

7. The hardware module of claim 1, wherein each of (i) the first register, (ii) the second register, (iii) the third register, and (iv) the fourth register is a 32 bit register.

* * * * *